INVENTOR
JAMES MILLWARD

BY Cushman, Darby & Cushman
ATTORNEYS

United States Patent Office 3,545,209
Patented Dec. 8, 1970

3,545,209
GAS TURBINE BY-PASS ENGINE
James Millward, Nuthall, England, assignor to Rolls-Royce Limited, Derby, Derbyshire, England, a British company
Filed June 7, 1968, Ser. No. 735,413
Claims priority, application Great Britain, June 19, 1967, 28,252/67
Int. Cl. F02k 1/20; B64c 15/06
U.S. Cl. 60—226                     4 Claims

ABSTRACT OF THE DISCLOSURE

A gas turbine by-pass engine having a fixed nozzle for the turbine exhaust gases coplanar with a plurality of nozzles for the by-pass air and deflector means which are movable between an inoperative position, in which the turbine exhaust gases and by-pass air pass out axially from the said nozzles, and an operative position in which at least part of the by-pass air is deflected without there being any substantial simultaneous deflection of the turbine exhaust gases.

---

This invention concerns a gas turbine by-pass engine.

According to the present invention, there is provided a vertical lift gas turbine by-pass engine suitable for mounting with its longitudinal axis substantially vertically oriented in an aircraft, the said engine having a fixed exhaust nozzle for the hot turbine exhaust gases and a plurality of discrete by-pass air nozzles grouped around the said fixed nozzle, the by-pass air nozzles and the fixed nozzle terminating in substantially the same radial plane relative to the longtiudinal axis and an individual deflector movably mounted on each of said by-pass air nozzles and so disposed that the said deflectors are movable in unison between an inoperative vertical lift position wherein the hot turbine exhaust gases and the by-pass air pass out axially from their respective nozzles, and an operative forward propulsion assisting position wherein by-pass air is deflected from all of the by-pass air nozzles in substantially the same direction without there being any substantial simultaneous deflection of the hot turbine exhaust gases.

Since the turbine exhaust gases are not deflected in an engine according to the present invention, it is not necessary to provide the relatively heavy and expensive deflector which would be required if deflection were to occur of the turbine exhaust gases.

The invention is of particular use in the case in which the engine has a high by-pass ratio, e.g. of at least 5:1 and preferably of at least 10:1. In this case, relatively little thrust will be due to the turbine exhaust gases and there is therefore relatively little loss of thrust during thrust deflection, by failure to deflect the turbine exhaust gases.

The by-pass air may pass through a fan driven by the engine. Thus the engine may have a radial flow turbine which drives an axial flow fan.

The engine is preferably a vertical lift engine having a thrust to weight ratio of at least 12:1.

The invention also comprises an aircraft in which there is vertically mounted at least one engine as set forth above.

Figure 1:
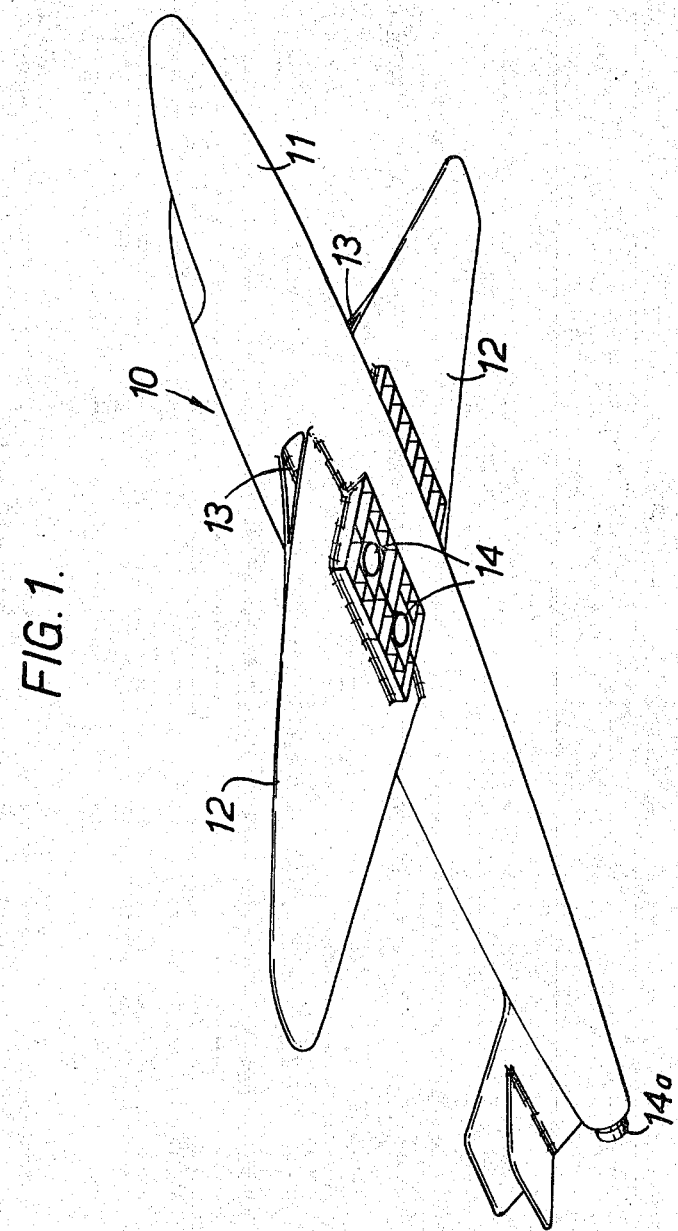
Figure 2:
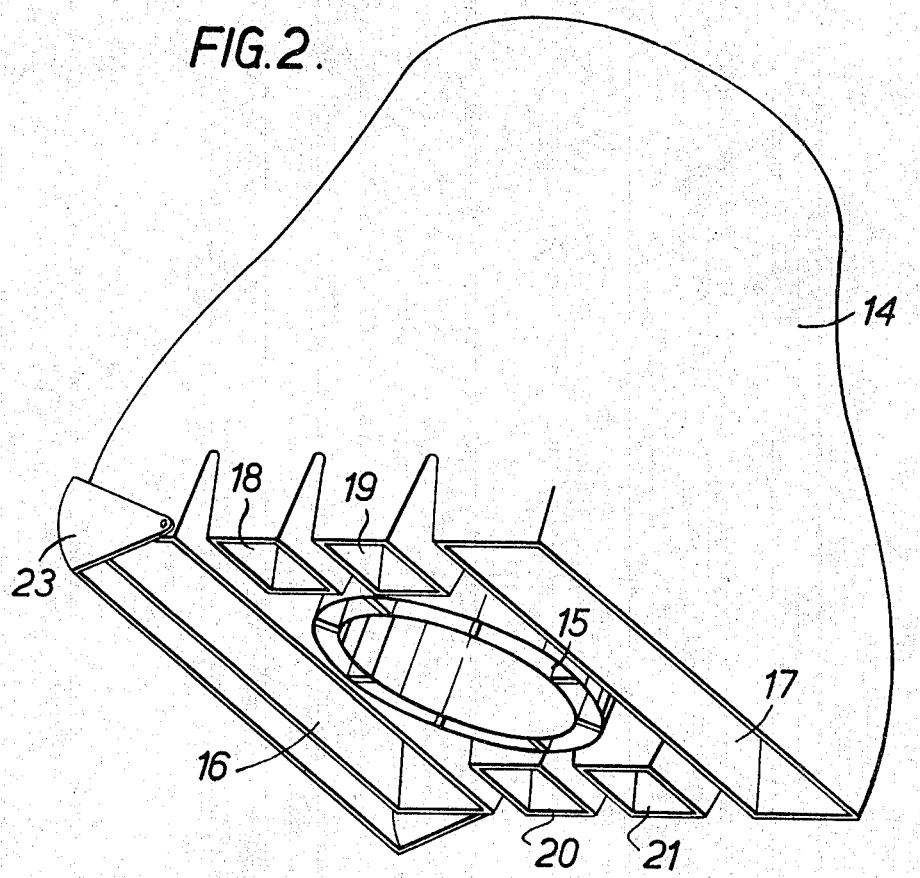
Figure 3:
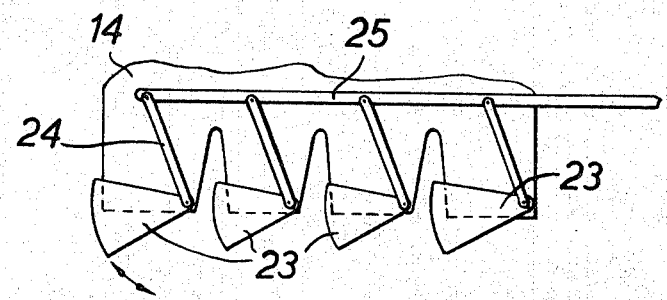

The invention is illustrated, merely by way of example, in the accompanying drawings, in which:

FIG. 1 is a diagrammatic view of an aircraft provided with gas turbine by-pass engines in accordance with the present invention, FIG. 2 is a perspective view of one such gas turbine by-pass engine, and FIG. 3 is a broken-away diagrammatic elevation of part of the structure of such an engine.

In FIG. 1 there is shown an aircraft 10 which is adapted for vertical take-off and landing and has a fuselage 11 and wings 12. Mounted at the rear of the fuselage 11 are two forward propulsion gas turbine engines (not shown) which are respectively provided with air intakes 13 and which have outlets 14a at the tail of the aircraft. Alternatively, there may be only one such forward propulsion engine.

Vertically mounted within each of the wings 12, so as to be disposed immediately adjacent to the fuselage 11, are two gas turbine by-pass engines 14. Each of the engines 14 is a vertical lift engine having a thrust weight ratio of at least 12:1 and preferably at least 16:1, the term "vertical lift engine" being used in this specification to indicate an engine adapted to produce vertical lift forces on an aircraft independently of those generated aerodynamically by forward flight of the aircraft.

The turbine exhaust gases from each engine 14 pass to atmosphere through an annular nozzle, or array of nozzles, 15. The annular nozzle 15 of each engine, is surrounded by six separate air nozzles 16, 17, 18, 19, 20, 21, for the by-pass air, the air nozzles 16 to 21 being disposed around the annular nozzle 15. The air nozzles 16, 17 are of elongated rectangular shape in section, while the air nozzles 18, 19, 20, 21 are substantially square in section.

Each of the air nozzles 16 to 21 is provided with a deflector 23, although, in order to simplify FIG. 2, only one such deflector 23 is shown therein. As shown diagrammatically in FIG. 3, each of the deflectors 23 is connected by a link 24 to a common link 25 which is itself moved by a ram (not shown) so as to be capable of moving the deflectors 23 between an operative and an inoperative position.

In the operative position of the deflectors 23, the by-pass air from each engine 14 is rearwardly deflected so as to assist forward propulsion of the engine. In this operative position, the by-pass air from the air nozzles 17, 18, 19, 20 and 21 will be deflected rearwardly without crossing the path of the turbine exhaust gases passing out through the annular nozzle 15. A portion of the by-pass air deflected from the air nozzle 16, however, will have to pass across the path of the turbine exhaust gases, so that the forward thrust from this portion will be thereby substantially lost. Except to the minor extent that the turbine exhaust gases may be affected slightly by this cross flow of by-pass air, there is, however, no deflection of the turbine exhaust gases 15 themselves.

Each of the engines 14 has, however, a by-pass ratio of 12:1 with the result that the thrust from the by-pass air and from the turbine exhaust gases is approximately in the ratio of 7:1. Although, therefore, the turbine exhaust gases are not capable of being deflected, when the engines 14 are used, to assist forward propulsion, the loss of thrust arising from the undeflected turbine exhaust gases is quite small. If this loss of thrust were not accepted, and these turbine exhaust gases were similarly deflected, it would be necessary to provide heavy and expensive deflectors to stand up to the turbine exhaust gases.

If desired, yaw control can be obtained by differential throttling of the two forward propulsion engines, and/or by special reverse thrust deflection devices on, say, two or four of the lift engines.

I claim:

1. A vertical lift gas turbine by-pass engine suitable for mounting with its longitudinal axis substantially vertically orientated in an aircraft, said engine having a fixed exhaust nozzle for hot turbine exhaust gases and a plurality of discrete by-pass air nozzles grouped around the said fixed exhaust nozzle, said by-pass air nozzles and the fixed exhaust nozzle terminating in substantially the same radial plane relative to the longitudinal axis of the engine, and an individual deflector movably mounted on each of said by-pass air nozzles and so disposed that all of said deflectors are movable in unison between inoperative vertical lift positions, wherein the hot turbine exhaust gases and the by-pass air pass out axially from their respective nozzles, and operative forward propulsion assisting positions, wherein by-pass air is deflected from all of the by-pass air nozzles in substantially the same direction without there being any substantial simultaneous deflection of the hot turbine exhaust gases, and means operatively connected to said deflectors for moving the deflectors in unison between said operative and said inoperative positions.

2. An engine as claimed in claim 1 in which the by-pass ratio of the engine is at least 5:1.

3. An engine as claimed in claim 2 in which the by-pass ratio is at least 10:1.

4. An engine as claimed in claim 1 in which the engine has a thrust to weight ratio of at least 12:1.

References Cited

UNITED STATES PATENTS

| 2,526,409 | 10/1950 | Price | 60—226 |
| 3,040,524 | 6/1962 | Kurti | 60—226 |
| 3,041,830 | 7/1962 | Thomas | 244—23 |
| 3,060,680 | 10/1962 | Wilde | 60—226 |
| 3,267,667 | 8/1966 | Erwin | 60—226 |
| 3,385,065 | 5/1968 | Coplin | 60—226 |
| 3,279,182 | 10/1966 | Helmintoller | 60—226 |

FOREIGN PATENTS

| 1,340,795 | 9/1963 | France | 244—12 |

DOUGLAS HART, Primary Examiner

U.S. Cl. X.R.

60—230; 239—265.25; 244—12